(12) United States Patent
Dueser

(10) Patent No.: US 9,840,330 B2
(45) Date of Patent: Dec. 12, 2017

(54) ENERGY SUPPLY SYSTEM FOR AN ELECTRICAL SEAT DEVICE IN AN AIRCRAFT OR SPACECRAFT

(71) Applicant: Airbus Operations GmbH, Hamburg (DE)

(72) Inventor: Gerd Dueser, Jork (DE)

(73) Assignee: Airbus Operations GmbH, Hamburg (DE)

( * ) Notice: Subject to any disclaimer, the term of this patent is extended or adjusted under 35 U.S.C. 154(b) by 404 days.

(21) Appl. No.: 14/599,882

(22) Filed: Jan. 19, 2015

(65) Prior Publication Data

US 2015/0203206 A1 Jul. 23, 2015

(30) Foreign Application Priority Data

Jan. 21, 2014 (DE) .................. 10 2014 201 010

(51) Int. Cl.

| | | |
|---|---|---|
| *B64D 11/06* | (2006.01) | |
| *B64D 41/00* | (2006.01) | |
| *H02J 1/14* | (2006.01) | |
| *H02J 5/00* | (2016.01) | |

(52) U.S. Cl.
CPC .......... *B64D 11/0624* (2014.12); *B64D 11/06* (2013.01); *B64D 41/00* (2013.01); *H02J 1/14* (2013.01); *H02J 5/005* (2013.01); *Y02T 50/46* (2013.01)

(58) Field of Classification Search
CPC .... B64D 11/06; B64D 11/0624; B64D 41/00; H02J 1/14; H02J 5/005; Y02T 50/46
USPC ........................................ 297/217.3; 307/9.1
See application file for complete search history.

(56) References Cited

U.S. PATENT DOCUMENTS

| | | | | |
|---|---|---|---|---|
| 6,059,364 | A * | 5/2000 | Dryburgh ............. | A47C 1/0352 |
| | | | | 105/322 |
| 9,318,922 | B2 * | 4/2016 | Hall .......................... | B60L 1/00 |
| 2009/0081947 | A1 * | 3/2009 | Margis ............... | H04B 7/18508 |
| | | | | 455/3.02 |
| 2009/0248246 | A1 | 10/2009 | Parison, Jr. et al. | |

(Continued)

FOREIGN PATENT DOCUMENTS

| | | |
|---|---|---|
| DE | 3719105 | 12/1988 |
| DE | 102008024217 | 12/2009 |

(Continued)

OTHER PUBLICATIONS

European Search Report, dated Jun. 16, 2015.
German Search Report, dated Jan. 21, 2014.

*Primary Examiner* — Levi Gannon
(74) *Attorney, Agent, or Firm* — Greer, Burns & Crain Ltd.

(57) ABSTRACT

An energy supply system for an electrical seat device in an aircraft or spacecraft comprises a control unit connected to the seat device, an energy supply which is configured to supply the control unit with electrical energy and an energy storage device which is configured to store electrical energy in a rechargeable manner and which is coupled to the control unit such that said energy storage device can be charged by the energy supply and such that the charging and discharging of said energy storage device can be controlled by the control unit, wherein the control unit is configured to use, as required, the electrical energy stored by the energy storage device to operate the seat device.

9 Claims, 2 Drawing Sheets

(56) References Cited

U.S. PATENT DOCUMENTS

| | | | |
|---|---|---|---|
| 2010/0187903 A1* | 7/2010 | Diab | B60R 16/023 307/9.1 |
| 2010/0201201 A1* | 8/2010 | Mobarhan | H02J 5/005 307/104 |
| 2010/0285747 A1 | 11/2010 | Bauer et al. | |
| 2010/0308166 A1* | 12/2010 | Bovelli | B64D 11/06 244/122 B |
| 2013/0020845 A1 | 1/2013 | Boomgarden et al. | |
| 2014/0252813 A1* | 9/2014 | Lee | H02J 17/00 297/180.12 |
| 2016/0134138 A1* | 5/2016 | Jouper | B60R 16/023 307/9.1 |

FOREIGN PATENT DOCUMENTS

| | | |
|---|---|---|
| DE | 102009019994 | 12/2009 |
| DE | 102009014802 | 11/2010 |
| DE | 102009042942 | 3/2011 |
| DE | 102010055696 | 6/2012 |
| DE | 102011118754 | 5/2013 |

* cited by examiner

ENERGY SUPPLY SYSTEM FOR AN ELECTRICAL SEAT DEVICE IN AN AIRCRAFT OR SPACECRAFT

CROSS-REFERENCES TO RELATED APPLICATIONS

This application claims the benefit of the German patent application No. 102014201010.1 filed on Jan. 21, 2014, the entire disclosures of which are incorporated herein by way of reference.

FIELD OF THE INVENTION

The present invention relates to an energy supply system for an electrical seat device in an aircraft or spacecraft.

Although the present invention and the problem which it addresses can be applied to any electrical seat devices in aircraft and spacecraft, they will be described in detail with regard to an aircraft.

BACKGROUND OF THE INVENTION

Seats in modern aircraft are typically equipped with many varied functions which require an electrical power supply. Thus, there are electronic seat adjustment systems which make it possible for a passenger to adjust his seat according to personal requirements. In this respect, actuators for example are used which convert the electrical signals from a control panel used by the passenger into a mechanical movement of the seat components. The infrastructure integrated into the aircraft for the power supply of the seats has to be tailored to the geometric and electrical requirements. The power can be supplied via power cables or alternatively via contactless connections. The power supply is usually so extensive that it is always capable of handling the maximum power consumption of the seat adjustment system which is used, even if the passenger only activates the seat adjustment system occasionally and at irregular intervals.

DE 10 2011 118 754 A1, for example, describes a seat control device for an aircraft seat comprising a seat control unit, which is also provided, inter alia, for controlling actuators in the aircraft seat.

DE 10 2008 024 217 A1 describes a system for the contactless transmission of data and energy between two parts of an aircraft.

SUMMARY OF THE INVENTION

It is one idea of the present invention to provide an energy supply system for an electrical seat device, which system allows for a simple and light-weight electrical infrastructure.

According to a first aspect of the invention, an energy supply system for an electrical seat device in an aircraft or spacecraft comprises a control unit connected to the seat device, an energy supply which is configured to supply the control unit with electrical energy, and an energy storage device which is configured to store electrical energy in a rechargeable manner and which is coupled to the control unit such that it can be charged by the energy supply and such that the charging and discharging thereof can be controlled by the control unit, said control unit being configured to use, as required, the electrical energy stored by the energy storage device to operate the seat device.

According to a second aspect of the invention, an electrical seat device for an aircraft and spacecraft having the above energy supply system is provided.

According to a third aspect of the invention, an aircraft and spacecraft having at least one electrical seat device of this type is provided.

According to a fourth aspect of the invention, a method for supplying energy to an electrical seat device of an aircraft or spacecraft comprises supplying electrical energy to the seat device, charging, in a controlled manner, a rechargeable energy storage device with electrical energy, and discharging, in a controlled manner, said energy storage device to operate the seat device.

The fundamental idea of the present invention is to provide an energy supply system in which an energy storage device is charged continuously over long periods of time and the electrical energy, stored therein, is used as required for a short period of time to operate a seat device.

The particular advantage of the solution according to the invention is that the electrical infrastructure supplying the seat device (i.e., cables, fasteners, plugs, lines, coils, etc.) can be restricted accordingly to the power consumption of the energy storage device. The fact that the infrastructure can thus be of a relatively small configuration means that weight is reduced and thereby fuel is saved, and the required installation volume is also reduced. Those functions of a seat device which have a high power consumption are often only required temporarily and at irregular intervals. In particular, the period of time over which they are used is often short compared to the typical duration of a flight. Accordingly, the energy storage device can thus be charged over long periods of time. The electrical energy in the energy storage device is then only made available for a short time when required. For this, the solution according to the invention provides a control unit which controls the charging and discharging procedures of the energy storage device and is installed in the seat device. For this purpose, the electrical energy is provided by an energy supply which is adapted to the power consumption of the energy storage device.

According to an embodiment, the seat device contains at least one consumer, the power consumption of which during operation is greater than the power consumption of the energy storage device. Thus in this case, an energy storage technology can be used in which the power consumed on average during the charging procedure is significantly lower than the maximally required, momentary power of the seat device. The energy storage device can be charged continuously over long periods of time at low power consumption and the electrical energy stored therein can be used at high power for a short time to operate the consumer. This has the particular advantage that the weight of the electrical infrastructure can be further reduced.

According to a further embodiment, the energy supply is configured such that electrical energy can be transmitted in a contactless manner from the energy supply to the control unit. A contactless energy transmission of this type has various advantages in an aircraft. For example, it is thus possible to achieve, in a simple manner, a modular seat concept in which a passenger cabin can be reconfigured in a flexible manner. In this case, seat devices do not have to be cabled in a fixed manner with the subfloor and the electronic consumers in the seat devices can be coupled electrically to stationary parts of the aircraft in all provided positions of the seat.

In a contactless construction of this type, the electrical energy may be transmitted inductively via coils between the energy supply and the control unit. For example, primary windings could be located in specific positions in the floor of a passenger cabin. To supply the seat devices with electrical energy, said seat devices could then simply be coupled to the primary windings via secondary windings installed therein.

Alternatively, according to a further embodiment, the energy supply can be connected to the control unit by a power cable. In this case, the seat device would then be connected to the energy supply by a conventional cabling system. However, due to the energy supply system according to the invention, it is possible to keep this cabling system in a very much simpler and lighter form compared to an infrastructure which is configured for providing the maximally required power consumption of the seat device.

According to a further embodiment, the at least one consumer is an actuator which is configured to adjust the seat device. This means that the electrical energy in the energy storage device can be converted into mechanical motion to adjust the seat device. For example, in the case of a contact-free energy transmission, the solution according to the invention makes it possible to use small coils to adequately supply an actuator of this type, which coils would not be powerful enough for a conventional energy supply.

There may be also an input unit which is connected to the control unit and is configured such that said input unit can control the adjustment of the seat device. Thus, in this development, a passenger can conveniently adjust the seat device using the control panel.

According to a further embodiment, a threshold value for the minimum amount of energy stored in the energy storage device is provided in the control unit, so that only the proportion of stored energy above this threshold value can be used for the operation of the seat device. This measure ensures that the energy storage device contains a minimum amount of energy required for automatically adjusting the seat device into a safety position. This is advantageous specifically from safety-relevant points of view, because in critical flight situations, such as take-off and landing, it can thus be ensured at any time that the seat devices can be automatically adjusted into a suitable position. Consequently, this safety mode is suitable as a redundant complementary system to other "fail-safe" modes, for example of a mechanical nature, and can thus be used to decrease the "design assurance levels" of a seat device.

The energy storage device may comprise at least one of a battery, a capacitor and a supercapacitor for temporarily storing the electrical energy. Special supercapacitors are distinguished in that, if necessary, they can be charged and in particular discharged very quickly and they also have a high cycle stability. Moreover, it is possible in principle to use any technology suitable for energy storage that stores electrical energy efficiently with a simultaneously high cycle stability and which can be discharged quickly and for a short time.

The above configurations and developments can be combined together in any desired sensible manner. Further possible configurations, developments and implementations of the invention also include not explicitly mentioned combinations of features of the invention described previously or described in the following in respect of the embodiments. In particular, a person skilled in the art will also add individual aspects as improvements or additions to the respective basic form of the present invention.

BRIEF DESCRIPTION OF THE DRAWINGS

In the following, the present invention will be described in more detail with reference to the embodiments represented in the schematic figures, in which.

Figure 1:
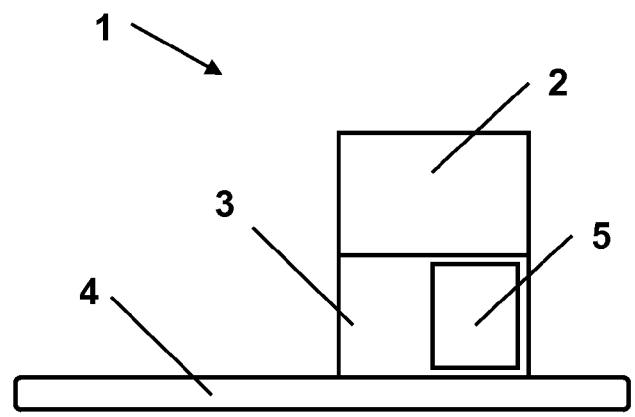
FIG. 1 shows a schematic construction of an energy supply system according to the invention for a seat device.

The accompanying figures are to provide a further understanding of the embodiments of the invention. They illustrate embodiments and, together with the description, serve to explain the principles and concepts of the invention. Other embodiments and many of the mentioned advantages are revealed in view of the drawings. The elements of the drawings have not necessarily been drawn true-to-scale relative to one another.

In the figures of the drawings, identical, functionally identical and identically acting elements, features and components have been respectively provided with the same reference numerals, unless indicated otherwise.

DETAILED DESCRIPTION OF THE PREFERRED EMBODIMENTS

FIG. 1 shows a schematic construction of an energy supply system 1 according to the invention for an electrical seat device, as provided for example for an aircraft or spacecraft. The illustrated system 1 comprises a seat device 2, a control unit 3 having an energy storage device 5 coupled thereto, and an energy supply 4.

The energy supply 4 supplies the control unit 3 and the energy storage device 5 with electrical energy. The energy storage device 5 is charged continuously, the charging procedure being controlled and regulated by the control unit 3. The control unit 3 uses, as required, some of the energy stored in the energy storage device 5 for operating the seat device 2. In this energy supply system 1, the energy supply and thereby the electrical infrastructure can be restricted to the power consumption of the energy storage device 5. Functions which are integrated into the seat device 2 and which have a greater power consumption than the energy storage device 5 can thus still be supplied with sufficient energy as long as they are only performed sporadically. The energy storage device 5 can be charged continuously at a relatively low power consumption and can thus be discharged, as required, at high power for short periods of time to operate the seat device 2. The precise course of the charging and discharging procedures of the energy storage device 5 is fixed by the control unit 3.

Figure 2:
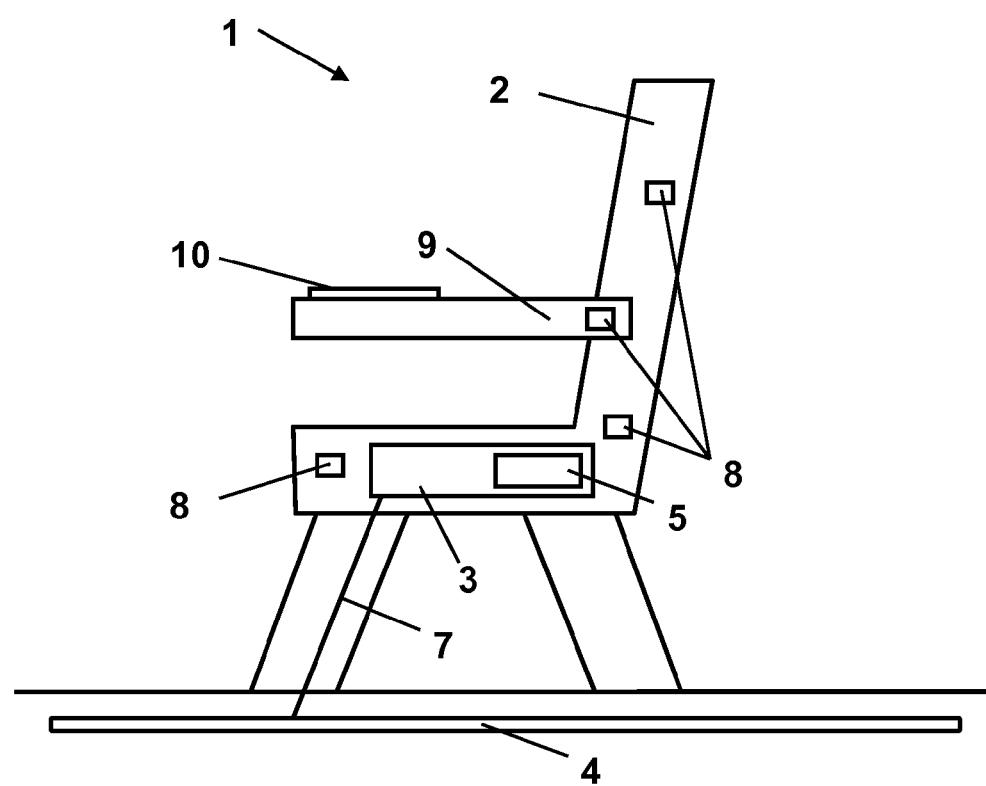
FIG. 2 is a schematic side view of an aircraft seat comprising an embodiment of an energy supply system according to the invention.

FIG. 2 is a schematic side view of an electrical aircraft seat 2 comprising an embodiment of an energy supply system 1 according to the invention which is based on the schematic embodiment of FIG. 1. The system 1 comprises an energy supply 4 which is connected to a control unit 3 by a power cable 7. The control unit contains an energy storage device 5. The aircraft seat 2 also comprises an armrest 9 on which an input unit 10 is fitted by which, inter alia, the seat 2 can be adjusted by actuators 8 located therein.

The energy storage device 5 can be a battery, a capacitor and/or a supercapacitor. Furthermore, it is also possible in principle to use any technology suitable for energy storage that stores electrical energy efficiently with a simultaneously high cycle stability and which can be discharged quickly and for a short time. Typical seat adjustment systems consume approximately 100 W and more power per seating place, i.e., more than 200 W per double seat. However, in this embodiment, the power cable 7 and the energy supply 4 must only be configured so that they can provide the power consumption of the energy storage device 5 during the charging procedure. The typical period of time during which a seat adjustment system is used is very short compared to the typical duration of a flight. Consequently, the energy storage device 5 can be charged continuously for long periods of time at low power consumption. Some of the energy stored therein can then be used, as required, to operate the actuators 8 at high power for a short time.

In this embodiment, a safety mode is provided which ensures that the energy storage device 5 always contains sufficient energy so the seat 2 can be automatically adjusted at any time into a safety position. Thus, in critical flight situations, such as take-off and landing, there is always sufficient energy to automatically bring the seat 2 into the prescribed safety position. This "fail-safe" mode can be used in redundancy to other safety modes to decrease the "design assurance level" of the seat 2.

During normal operation, a passenger adjusts the seat 2 via the control panel 10 in the armrest 9 of the seat 2. A configuration of the energy storage device 5 is provided which allows for various adjustments of the seat 2 without the energy storage device 5 thereby being discharged to a minimum charge. If, nevertheless, for whatever reasons the seat 2 is adjusted so often that the energy storage device 5 only contains the minimum amount of energy prescribed by the safety mode, the seat can temporarily not be adjusted any longer until the energy storage device 5 has been sufficiently recharged.

Figure 3:
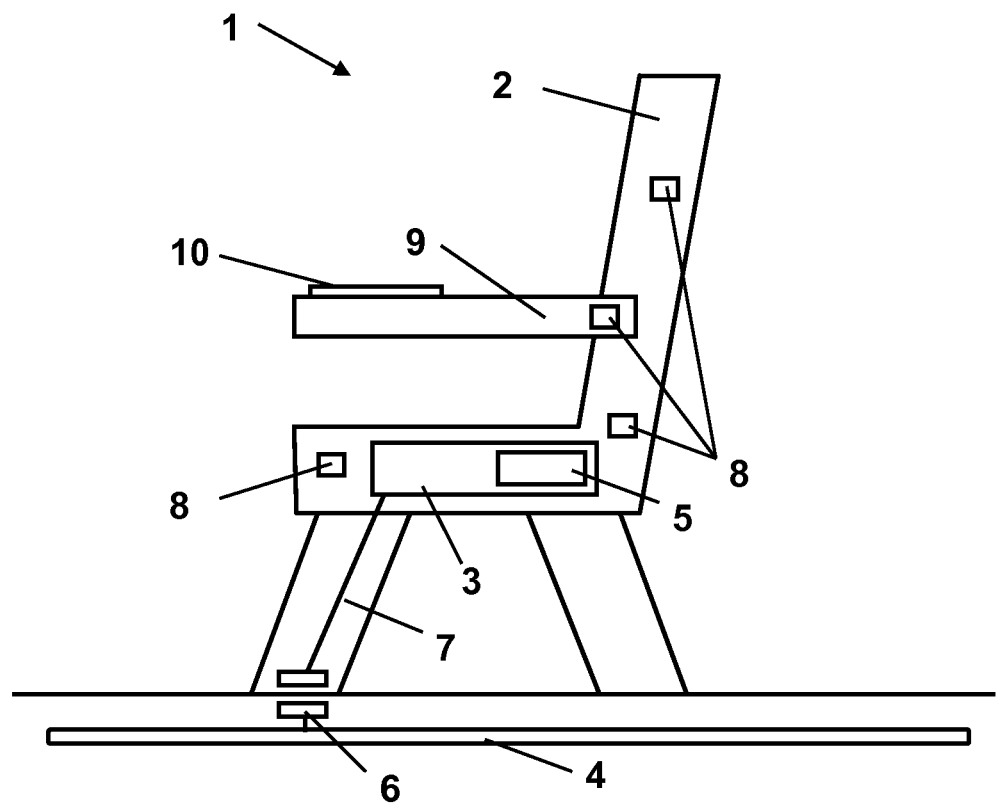
FIG. 3 is a schematic side view of an aircraft seat comprising an alternative embodiment of an energy supply system according to the invention.

FIG. 3 is a schematic side view of an aircraft seat 2 comprising an alternative embodiment of an energy supply system 1 according to the invention. The construction of the system is substantially identical to that of FIG. 2. The system 1 comprises a seat 2 having an energy supply 4, a control unit 3 having an energy storage device 5, an armrest 9 having a control unit 10 and actuators 8 which are configured to adjust the seat 2. However, in this embodiment, the energy supply 4 is not connected to the control unit 3 by a power cable 7 (cf. FIG. 2), but by a contactless system consisting of coils 6. Here as well as in FIG. 2, the energy storage device can be a battery, a capacitor and/or a supercapacitor or a corresponding storage technology.

The contactless coupling of the seat to a power supply has the advantage, inter alia, that the position of the seat can be conveniently changed relative to the floor without cables etc., which are required for the energy supply, also having to be laid, which is laborious. Instead, provided in the floor are various coupling positions at which primary windings are located. By means of the secondary windings located in the seat, a seat can be secured in any position in which a primary winding is located. In this energy supply system 1, the transmission coils 6 used for this purpose can be very small, for example with a power consumption of significantly less than 100 W, which is at least necessary for operating the actuators 8.

In the solution according to the invention, the energy consumption is divided up over a long period of time so that the energy supply 4 does not have to be configured for short-term high energy transmission. Thus, compared to a conventional cabling system without an energy storage device 5, as is provided in this invention, the weight is reduced which, in turn, saves fuel and lowers running costs. Furthermore, the energy supply 4 which is provided requires a significantly smaller installation volume.

Figure 4:
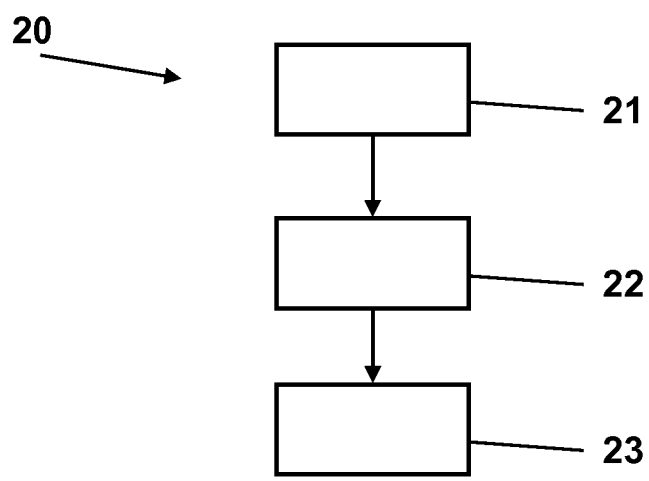
FIG. 4 is a schematic view of a method for the supply of energy to an electrical seat device according to the invention.

FIG. 4 is a schematic view of a method 20 for supplying energy to an electrical seat device 2 according to the invention, as shown for example in FIG. 2 or 3. The method comprises, in a first step 21, supplying electrical energy to the seat device, in a second step, 22, charging, in a controlled manner, a rechargeable energy storage device with electrical energy, and in a third step 23, discharging, in a controlled manner, said energy storage device for operating the seat device.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An energy supply system for an electrical seat device in an aircraft or spacecraft, the energy supply system comprising:
   a control unit connected to the seat device;
   an energy supply which is configured to supply the control unit with electrical energy; and
   an energy storage device which is configured to store electrical energy in a rechargeable manner and which is coupled to the control unit such that said energy storage device can be charged by the energy supply and such that the charging and discharging of said energy storage device can be controlled by the control unit;
   wherein the control unit is configured to use, as required, the electrical energy stored by the energy storage device to operate the seat device;
   wherein the seat device contains at least one consumer, the power consumption of which during operation is greater than the power consumption of the energy storage device;
   wherein the at least one consumer is an actuator which is configured to adjust the seat device; and
   wherein a threshold value for the minimum amount of energy stored in the energy storage device is provided in the control unit so that only the proportion of stored energy above this threshold value can be used for the operation of the seat device.

2. The energy supply system according to claim 1, wherein the energy supply is configured such that electrical energy is transmitted in a contactless manner from the energy supply to the control unit.

3. The energy supply system according to claim 2, wherein the electrical energy is transmitted inductively by coils between the energy supply and the control unit.

4. The energy supply system according to claim 1, wherein the energy supply is connected to the control unit by a power cable.

5. The energy supply system according to claim 1, further comprising at least one input unit which is connected to the control unit and is configured so that the adjustment of the seat device can be controlled by the input unit.

6. The energy supply system according to claim 1, wherein the energy storage device comprises at least one of a battery, a capacitor and a supercapacitor.

7. An electrical seat device for an aircraft or spacecraft, comprising an energy supply system comprising:
   a control unit connected to the seat device;
   an energy supply which is configured to supply the control unit with electrical energy; and an energy storage device which is configured to store electrical energy in a rechargeable manner and which is coupled to the control unit such that said energy storage device can be charged by the energy supply and such that the charging and discharging of said energy storage device can be controlled by the control unit;

wherein the control unit is configured to use, as required, the electrical energy stored by the energy storage device to operate the seat device;

wherein the seat device contains at least one consumer, the power consumption of which during operation is greater than the power consumption of the energy storage device;

wherein the at least one consumer is an actuator which is configured to adjust the seat device; and wherein a threshold value for the minimum amount of energy stored in the energy storage device is provided in the control unit so that only the proportion of stored energy above this threshold value can be used for the operation of the seat device.

8. A method for supplying energy to an electrical seat device according to claim 7 of an aircraft or spacecraft, the method comprising:

supplying electrical energy to the seat device;

charging, in a controlled manner, a rechargeable energy storage device with electrical energy; and discharging, in a controlled manner, said energy storage device to operate the seat device.

9. An aircraft or spacecraft comprising at least one electrical seat device, comprising an energy supply system comprising:

a control unit connected to the seat device;

an energy supply which is configured to supply the control unit with electrical energy; and an energy storage device which is configured to store electrical energy in a rechargeable manner and which is coupled to the control unit such that said energy storage device can be charged by the energy supply and such that the charging and discharging of said energy storage device can be controlled by the control unit;

wherein the control unit is configured to use, as required, the electrical energy stored by the energy storage device to operate the seat device;

wherein the seat device contains at least one consumer, the power consumption of which during operation is greater than the power consumption of the energy storage device;

wherein the at least one consumer is an actuator which is configured to adjust the seat device; and wherein a threshold value for the minimum amount of energy stored in the energy storage device is provided in the control unit so that only the proportion of stored energy above this threshold value can be used for the operation of the seat device.

\* \* \* \* \*